United States Patent
Ueno et al.

(10) Patent No.: US 11,643,480 B2
(45) Date of Patent: May 9, 2023

(54) PHOTOCURABLE COMPOSITION

(71) Applicant: THREEBOND CO., LTD., Tokyo (JP)

(72) Inventors: Kazuyuki Ueno, Tokyo (JP); Yoshihide Arai, Tokyo (JP); Takashi Nemoto, Tokyo (JP)

(73) Assignee: THREEBOND CO., LTD., Tokyo (JP)

( * ) Notice: Subject to any disclaimer, the term of this patent is extended or adjusted under 35 U.S.C. 154(b) by 94 days.

(21) Appl. No.: 17/241,738

(22) Filed: Apr. 27, 2021

(65) Prior Publication Data

US 2021/0355251 A1 Nov. 18, 2021

(30) Foreign Application Priority Data

May 14, 2020 (JP) .............................. JP2020-084884

(51) Int. Cl.
*C08F 2/50* (2006.01)
*C08F 290/06* (2006.01)
*C08J 5/18* (2006.01)

(52) U.S. Cl.
CPC ............ *C08F 2/50* (2013.01); *C08F 290/067* (2013.01); *C08J 5/18* (2013.01)

(58) Field of Classification Search
USPC .......................................................... 522/96
See application file for complete search history.

(56) References Cited

U.S. PATENT DOCUMENTS

| 2015/0024218 A1* | 1/2015 | Koga | ................... | C09J 175/16 |
| | | | | 428/423.1 |
| 2021/0206888 A1* | 7/2021 | Ueno | ..................... | C09D 4/06 |
| 2021/0206959 A1* | 7/2021 | Ueno | ..................... | C08F 2/44 |

FOREIGN PATENT DOCUMENTS

JP 2018-024785 A 2/2018

* cited by examiner

*Primary Examiner* — Sanza L. McClendon
(74) *Attorney, Agent, or Firm* — Lucas & Mercanti, LLP

(57) ABSTRACT

The present invention makes it possible to maintain a high 180-degree peel strength of a photocurable composition having a film shape at 25° C. in the state of not being cured against untreated PET as an adherend when bonding is performed by lamination at normal temperature.

A photocurable composition having a film shape at 25° C. in a state of not being cured, which contains the following components (A) to (C) and in which the photocurable composition contains 1 to 45 parts by mass of the component (B) with respect to 100 parts by mass of the component (A), a temperature of tan $\delta=1$ is 30° C. to 60° C. before curing, a storage elastic modulus at 25° C. is $10.0 \times 10^5$ Pa or less after curing.

Component (A): urethane-modified (meth)acrylate oligomer
Component (B): film forming agent
Component (C): photoinitiator

10 Claims, No Drawings

PHOTOCURABLE COMPOSITION

CROSS-REFERENCE TO RELATED APPLICATION

Background

1. Technical Field

The present invention relates to a photocurable composition having a film shape at 25° C. in a state of not being cured.

2. Description of Related Arts

It is important that the adhesive films maintain their dimensions. In addition, adherends having curved surfaces instead of flat surfaces have been developed, and there are cases which cannot be coped only with flat adherends like laminators. Hence, there is a demand for those that can be transferred at 20° C. to 30° C. (normal temperature) in order to perform transfer only by pressure. In Japanese Patent Application Laid-Open No. 2018-024785 as well, an adhesive sheet is formed from an adhesive component and a release film. However, the adhesive sheet does not contain a component for forming a film, is equivalent to a so-called pressure sensitive adhesive, and is crushed when pressure is applied, and the thickness thereof changes as well as the adhesive component is squeezed from the end face.

SUMMARY

Hitherto, it has been difficult to maintain a high 180-degree peel strength of a photocurable composition having a film shape at 25° C. in the state of not being cured against untreated PET as an adherend when bonding is performed at normal temperature. In general, the surface tension of plastic films is low, and thus problems such as poor adhesion often occur during printing and coating. When surface treatment such as corona treatment is performed, the surface tension of the base material is significantly improved, and the adhesive force is thus improved. The term "untreated" in untreated PET means that PET has not been subjected to a surface treatment.

The present inventors have diligently studied to achieve the above object, as a result, have found out a method regarding a photocurable composition having a film shape at 25° C. in the state of not being cured, and have thus completed the present invention.

The gist of the present invention will be described below.

A first embodiment of the present invention is a photocurable composition having a film shape at 25° C. in a state of not being cured, which contains the following components (A) to (C) and in which the photocurable composition contains 1 to 45 parts by mass of the component (B) with respect to 100 parts by mass of the component (A), a temperature of tan $\delta$=1 is 30° C. to 60° C. before curing, and a storage elastic modulus at 25° C. is $10.0\times10^5$ Pa or less after curing.

Component (A): urethane-modified (meth)acrylate oligomer
Component (B): film forming agent
Component (C): photoinitiator A second embodiment of the present invention is the photocurable composition having a film shape at 25° C. in a state of not being cured according to the first embodiment, in which the component (B) is a phenoxy resin that is solid at 25° C. and does not have a (meth)acrylic group in a molecule.

A third embodiment of the present invention is the photocurable composition having a film shape at 25° C. in a state of not being cured according to the first or second embodiment, which further contains a (meth)acrylate monomer (excluding the component (A)) as a component (D) and in which the photocurable composition contains 0.1 to 10 parts by mass of the component (D) with respect to 100 parts by mass of the component (A).

A fourth embodiment of the present invention is the photocurable composition having a film shape at 25° C. in a state of not being cured according to any one of the first to third embodiments, which further contains a coupling agent as a component (E).

A fifth embodiment of the present invention is the photocurable composition having a film shape at 25° C. in a state of not being cured according to any one of the first to fourth embodiments, in which the temperature at tan $\delta$=1 is 30° C. to 50° C. before curing and the storage elastic modulus at 25° C. is $1.0\times10^5$ to $10.0\times10^5$ Pa after curing.

A sixth embodiment of the present invention is the photocurable composition having a film shape at 25° C. in a state of not being cured according to any one of the first to fifth embodiments, in which a weight average molecular weight of the component (A) is 20000 to 40,000 and a (meth)acrylic group equivalent of the component (A) is 15000 to 25000 g/eq.

A seventh embodiment of the present invention is the photocurable composition having a film shape at 25° C. in a state of not being cured according to any one of the first to sixth embodiments, in which the photocurable composition contains 20 to 40 parts by mass of the component (B) with respect to 100 parts by mass of the component (A).

An eighth embodiment of the present invention is the photocurable composition having a film shape at 25° C. in a state of not being cured according to any one of the first to seventh embodiments, in which the photocurable composition can be transferred to an adherend at 20° C. to 30° C.

A ninth embodiment of the present invention is a cured product obtained by curing the photocurable composition having a film shape at 25° C. in a state of not being cured according to any one of the first to eighth embodiments, in which the storage elastic modulus at 25° C. is $10.0\times10^5$ Pa or less.

A tenth embodiment of the present invention is the cured product according to the ninth embodiment, in which a storage elastic modulus is $1.0\times10^5$ to $10.0\times10^5$ Pa.

An eleventh embodiment of the present invention is a bonding method of two adherends, which includes transferring the photocurable composition having a film shape at 25° C. in a state of not being cured according to any one of the first to eighth embodiments to one adherend in an atmosphere of 20° C. to 30° C. and then transferring the photocurable composition to another adherend as well.

A twelfth embodiment of the present invention is the bonding method according to the eleventh embodiment, in which vacuum heating is performed on a laminate transferred to two adherends.

A thirteenth embodiment of the present invention is the bonding method according to the twelfth embodiment, in which a temperature in vacuum heating is 30° C. to 60° C.

A fourteenth embodiment of the present invention is a stock solution containing components (A) to (C) and a solvent, in which the stock solution contains 1 to 45 parts by mass of the component (B) with respect to 100 parts by mass of the component (A).

A fifteenth embodiment of the present invention is a method for producing a photocurable composition having a film shape at 25° C. in a state of not being cured, which includes obtaining a photocurable composition having a film shape at 25° C. by volatilizing the solvent in the stock solution according to the fourteenth embodiment.

A sixteenth embodiment of the present invention is a stock solution containing a photocurable composition having a film shape at 25° C. in a state of not being cured and a solvent.

DETAILED DESCRIPTION

An embodiment of the present invention is a photocurable composition having a film shape at 25° C. in a state of not being cured, which contains the following components (A) to (C) and in which the photocurable composition contains 1 to 45 parts by mass of the component (B) with respect to 100 parts by mass of the component (A), a temperature of tan δ=1 is 30° C. to 60° C. before curing, a storage elastic modulus at 25° C. is $10.0 \times 10^5$ Pa or less after curing:

Component (A): urethane-modified (meth)acrylate oligomer

Component (B): film forming agent component (C): photoinitiator.

The present invention makes it possible to maintain a high 180-degree peel strength of a photocurable composition having a film shape at 25° C. in the state of not being cured against untreated PET as an adherend when bonding is performed by lamination at normal temperature.

Incidentally, a photocurable composition refers to a state of not being photocured and is a composition of which the adhesive property is exerted or the adhesive property is improved by photocuring.

Details of the present invention will be described below. The component (A) that can be used in the present invention is a urethane-modified (meth)acrylate oligomer from the viewpoint of favorable adhesive property to glass and plastics of protective panels. This oligomer is synthesized, for example, from the reaction product of a polyol compound (main skeleton) having two or more hydroxyl groups in the molecule, a compound having two or more isocyanate groups in the molecule, and a (meth)acrylate having at least one or more hydroxyl groups in the molecule. Examples of the compound having two or more isocyanate groups in the molecule include an aromatic polyisocyanate, an alicyclic polyisocyanate, an aliphatic polyisocyanate, and the like, and an aliphatic polyisocyanate and an alicyclic polyisocyanate are preferable among these from the viewpoint of obtaining a flexible cured product. These may be used singly, or a plurality of these may be used in combination. In the present specification, an acrylate is also referred to as acryloyl and a methacrylate is also referred to as methacryloyl, an acrylate and a methacrylate are also collectively called a (meth)acrylate, and acryloyl and methacryloyl are also collectively called (meth)acryloyl. In addition, the numerical value range indicated by "X to Y" is used in the meaning that the numerical values (X and Y) described before and after it are included as the lower limit value and the upper limit value, and means "X or more and Y or less".

The weight average molecular weight of the component (A) is preferably 20,000 to 60,000, still more preferably 20,000 to 40,000. The curability is favorable when the weight average molecular weight is 20000 or more, and the viscosity is low and the attachment at the interface is favorable when the photocurable composition is bonded to the adherend when the weight average molecular weight is 60,000 or less. Here, in the present specification, the weight average molecular weight refers to the weight average molecular weight in terms of polystyrene measured by gel permeation chromatography. The (meth)acrylic group equivalent of the component (A) is preferably 5000 to 25000 g/eq, more preferably 15000 to 25000 g/eq. The curability is favorable when the (meth)acrylic group equivalent is 5000 g/eq or more, and the attachment at the interface is favorable when the photocurable composition is bonded to the adherend when the (meth)acrylic group equivalent is 25000 g/eq or less. Here, the (meth)acrylic group equivalent is the molecular weight/number of functional groups and refers to the molecular weight per (meth)acrylic group.

Examples of the polyol compound having two or more hydroxyl groups in the molecule include polyether polyol, polyester polyol, caprolactone diol, bisphenol polyol, polyisoprene polyol, hydrogenated polyisoprene polyol, polybutadiene polyol, hydrogenated polybutadiene polyol, castor oil polyol, polycarbonate diol, and the like. Among these, polycarbonate diol, polybutadiene polyol, and hydrogenated polybutadiene polyol are preferable since these exhibit excellent transparency and excellent durability, and polycarbonate diol is particularly preferable from the viewpoint that the cured product does not become cloudy in a high temperature and high humidity atmosphere. These may be used singly, or a plurality of these may be used in combination.

As the compound having two or more isocyanate groups in the molecule, there are an aromatic polyisocyanate and an aliphatic polyisocyanate. Examples of the aromatic polyisocyanate include 2,4-tolylene diisocyanate, 2,6-tolylene diisocyanate, 1,3-xylylene diisocyanate, 1,4-xylylene diisocyanate, tetramethylxylylene diisocyanate, diphenylmethane diisocyanate, naphthalene-1,5-diisocyanate, triphenylmethane triisocyanate, and the like, examples of the alicyclic polyisocyanate include isophorone diisocyanate, bis(4-isocyanatocyclohexyl)methane, 1,3-bis(isocyanatomethyl)cyclohexane, 1,4-bis(isocyanatomethyl)cyclohexane, norbornane diisocyanate, bicycloheptane triisocyanate, and the like, and examples of the aliphatic polyisocyanate include hexamethylene diisocyanate, 1,3,6-hexamethylene triisocyanate, 1,6,11-undecatorisocyanate, and the like. Among these, diisocyanates such as isophorone diisocyanate and hexamethylene diisocyanate are preferable.

Examples of the (meth)acrylate having at least one or more hydroxyl groups in the molecule include mono(meth)acrylates of dihydric alcohols such as ethylene glycol, propylene glycol, 1,3-propanediol, 1,3-butanediol, 1,4-butanediol, polyethylene glycol and the like, mono(meth)acrylates or di(meth)acrylates of trihydric alcohols such as trimethylolethane, trimethylolpropane, glycerin and the like, and the like. Among these, mono(meth)acrylates of dihydric alcohols are preferable and a mono(meth)acrylate of ethylene glycol is more preferable from the viewpoint of obtaining a cured product exhibiting excellent flexibility. These may be used singly, or a plurality of these may be used in combination.

The method for synthesizing the urethane-modified (meth)acrylate oligomer is not particularly limited, and a known method can be used. Examples thereof include the following methods. A polyol compound having two or more hydroxyl groups in the molecule and an isocyanate compound having two or more isocyanate groups in the molecule are reacted at a proportion of preferably 3:1 to 1:3, still more preferably 2:1 to 1:2 as a molar ratio (polyol compound:isocyanate compound) in a diluent (for example, methyl ethyl ketone, methoxyphenol, or the like) to obtain a urethane prepolymer. Subsequently, the isocyanate group remaining in the obtained urethane prepolymer is further reacted with a (meth)acrylate having at least one or more hydroxyl groups in the molecule in an amount sufficient to react with this isocyanate group to synthesize a urethane (meth)acrylate oligomer.

Examples of the catalyst used at the time of synthesis include lead oleate, tetrabutyltin, antimony trichloride, triphenylaluminum, trioctylaluminum, dibutyltin dilaurate, copper naphthenate, zinc naphthenate, zinc octylate, zinc octenoate, zirconium naphthenate, cobalt naphthenate, tetra-n-butyl-1,3-diacetyloxydistanoxane, triethylamine, 1,4-diaza[2,2,2]bicyclooctane, N-ethylmorpholine and the like, and dibutyltin dilaurate, zinc naphthenate, zinc octylate, and zinc octenoate are preferably used among these since activity is high and a cured product exhibiting excellent transparency is obtained. It is preferable to use 0.0001 to 10 parts by mass of these catalysts with respect to 100 parts by mass of the total amount of reactants. In addition, it is preferable to conduct the reaction at a reaction temperature of usually 10° C. to 100° C., particularly 30° C. to 90° C. As the urethane-modified (meth)acrylate oligomer, one diluted with a solvent or the following monomer (component (D)) at the raw material stage may be used.

The component (B) that can be used in the present invention is a film forming agent, and 1 to 45 parts by mass of the component (B) is contained, particularly preferably 20 to 40 parts by mas with respect to 100 parts by mass of the component (A). By this, lamination at normal temperature is realized. Components other than the component (B) are often liquids in an atmosphere of 25° C., and the component (B) that is a solid or a liquid not exhibiting fluidity in an atmosphere of 25° C. is added in order to form the photocurable composition into a film shape in an atmosphere of 25° C. Unlike a composition that is a liquid at 25° C., the composition does not stick out from the edge of the adherend when used for bonding of plate-shaped adherends by forming the photocurable composition into a film shape not exhibiting fluidity at 25° C.

A particularly preferable component (B) is a phenoxy resin. The phenoxy resin is a polymer obtained by polymerizing a polyfunctional epoxy resin such as a bisphenol type epoxy resin, and an epoxy group remains at the terminal. The weight average molecular weight is preferably 10,000 to 100,000, more preferably 30,000 to 80,000. Specific examples of the phenoxy resin include a bisphenol type phenoxy resin, a novolak type phenoxy resin, a naphthalene type phenoxy resin, a biphenyl type phenoxy resin and the like. These may be used singly, or a plurality of these may be used in combination. As the phenoxy resin, bisphenol type phenoxy resins which are solids at 25° C. are preferable, and among these, a phenoxy resin obtained by polymerizing only a bisphenol A type epoxy resin, a phenoxy resin obtained by polymerizing only a bisphenol F type epoxy resin, a phenoxy resin obtained by copolymerizing a bisphenol A type epoxy resin and a bisphenol F type epoxy resin, and a phenoxy resin which is a mixture of these are more preferable since these phenoxy resins exhibit favorable compatibility with the component (A) of the present invention. In addition, a phenoxy resin which does not have a side chain having a (meth)acrylic group in the molecule is preferable so that fluidity is not immediately exerted by heating. These may be used singly, or a plurality of these may be used in combination. As a suitable embodiment, the component (B) is a phenoxy resin which is solid at 25° C. and does not have a (meth)acrylic group in the molecule.

As the phenoxy resin of the component (B), commercially available products can be used, and specific examples thereof include YP-50, YP-50S, YP-55, YP-70, ZX-1356-2, FX-316 and the like as the Phenototo series manufactured by NIPPON STEEL Chemical & Material Co., Ltd., 1256, 4250, 4275 and the like as the jER series manufactured by Mitsubishi Chemical Corporation, PKHB, PKHC, PKHH, PKHJ, PKFE and the like manufactured by TOMOE ENGINEERING CO., LTD., and the like, but are not limited thereto. As the component (B), one diluted with a solvent at the raw material stage may be used.

The amount of the component (B) added in the present invention is preferably 1 to 45 parts by mass, more preferably 20 to 40 parts by mass with respect to 100 parts by mass of the component (A). When the amount of the component (B) added is 1 part by mass or more, the film forming property is exerted and the photocurable composition is not or is less sticky, and the release film and the like are easily peeled off. Meanwhile, when the amount of the component (B) added is parts by mass or less, lamination at normal temperature is possible.

The component (C) used in the present invention is a photoinitiator. The photoinitiator is a compound which decomposes to generate radical species, cation species, or anion species by being irradiated with active energy rays such as ultraviolet light and visible light.

Examples of the component (C) include an acetophenone-based photoinitiator, a benzoin-based photoinitiator, a benzophenone-based photoinitiator, a thioxanthone-based photoinitiator, an acylphosphine oxide-based photoinitiator, and the like. These may be used singly or two or more kinds thereof may be used concurrently. When an acylphosphine oxide-based photoinitiator, which is easily cured by energy rays in the visible light region, is added to the composition, the composition itself is likely to turn yellow, but it is preferable to contain an acylphosphine oxide-based photoinitiator since the photocurability is improved.

Examples of the acetophenone-based photoinitiator include diethoxyacetophenone, 2-hydroxy-2-methyl-1-phenylpropan-1-one, benzyl dimethyl ketal, 4-(2-Hydroxyethoxy)phenyl-(2-hydroxy-2-propyl) ketone, 1-hydroxycyclohexylphenyl ketone, 2-methyl-2-morpholino(4-thiomethylphenyl)propan-1-one, 2-benzyl-2-dimethylamino-1-(4-morpholinophenyl)butanone, 2-hydroxy-2-methyl-1-[4-(1-methylvinyl)phenyl]propanone oligomer, and the like, but are not limited thereto.

Examples of the benzoin-based photoinitiator include benzoin, benzoin methyl ether, benzoin ethyl ether, benzoin isopropyl ether, benzoin isobutyl ether, and the like, but are not limited thereto.

Examples of the benzophenone-based photoinitiator include benzophenone, methyl o-benzoyl benzoate, 4-phenylbenzophenone, 4-benzoyl-4'-methyl-diphenylsulfide, 3,3',4,4'-tetra(t-butylperoxycarbonyl)benzophenone, 2,4,6-trimethylbenzophenone, 4-benzoyl-N,N-dimethyl-N-[2-(1-oxo-2-propenyloxy)ethyl]benzenemethanamineium bromide, (4-benzoylbenzyl)trimethylammonium chloride, and the like, but are not limited thereto.

Examples of the thioxanthone-based photoinitiator include 2-isopropylthioxanthone, 4-isopropylthioxanthone, 2,4-diethylthioxanthone, 2,4-dichlorothioxanthone, 1-chloro-4-propoxythioxanthone, 2-(3-dimethylamino-2-hydroxy)-3,4-dimethyl-9H-thioxanthone-9-one mesochloride, and the like, but are not limited thereto.

Examples of the acylphosphine oxide-based photoinitiator include bis(2,4,6-trimethylbenzoyl)-phenylphosphine oxide, 2,4,6-trimethylbenzoyl-diphenylphosphine oxide, 2,4,6-trimethylbenzoylphenylethoxyphosphine oxide, and the like, but are not limited thereto.

The amount of the component (C) added is preferably 0.1 to 5.0 parts by mass with respect to 100 parts by mass of the component (A). Photocurability is exerted when the amount of the component (C) added is 0.1 part by mass or more, and the possibility that the composition is colored decreases when the amount of the component (C) added is 5.0 parts by mass or less.

The photocurable composition of the present invention preferably further contains a component (D): (meth)acrylate monomer (excluding the component (A)). As the component (D) is further contained, the temperature of tan δ can be lowered.

Examples of the (meth)acrylate monomer (excluding the component (A)) that can be used as the component (D) of the present invention include monofunctional, bifunctional, trifunctional, and tetrafunctional or higher polyfunctional monomers. As the component (D), a bifunctional (meth)acrylate monomer is preferable from the viewpoint of improving the adhesive strength. The molecular weight of the monomer is preferably 10000 or less, more preferably 5000 or less, most preferably 1000 or less in order to lower the viscosity of the composition.

Examples of the monofunctional monomer include lauryl (meth)acrylate, stearyl (meth)acrylate, tetrahydrofurfuryl (meth)acrylate, caprolactone-modified tetrahydrofurfuryl (meth)acrylate, cyclohexyl (meth)acrylate, dicyclopentanyl (meth)acrylate, isobornyl (meth)acrylate, benzyl (meth)acrylate, phenyl (meth)acrylate, phenoxyethyl (meth)acrylate, phenoxydiethylene glycol (meth)acrylate, phenoxytetraethylene glycol (meth)acrylate, nonylphenoxyethyl (meth)acrylate, butoxyethyl (meth)acrylate, 2-hydroxyethyl (meth)acrylate, 2-hydroxypropyl (meth)acrylate, glycerol (meth)acrylate, modified butyl (meth)acrylate, epichlorohydrin-modified phenoxy (meth)acrylate, N,N-dimethylaminoethyl (meth)acrylate, N,N-diethylaminoethyl (meth)acrylate, morpholino (meth)acrylate, polyethylene glycol mono(meth)acrylate, polypropylene glycol mono(meth)acrylate, polyoxytetramethylene glycol mono(meth)acrylate and the like.

Examples of the bifunctional monomer include neopentyl glycol di(meth)acrylate, bisphenol A di(meth)acrylate, epichlorohydrin-modified bisphenol A di(meth)acrylate, stearic acid-modified pentaerythritol di(meth)acrylate, dicyclopentenyl di(meth)acrylate, di(meth)acryloyl isocyanurate, polyethylene glycol di(meth)acrylate, polypropylene glycol di(meth)acrylate, polyoxytetramethylene glycol di(meth)acrylate and the like.

Examples of the trifunctional monomer include trimethylolpropane tri(meth)acrylate, pentaerythritol tri(meth)acrylate, epichlorohydrin-modified trimethylolpropane tri(meth)acrylate, epichlorohydrin-modified glycerol tri(meth)acrylate and the like.

Examples of the polyfunctional monomer include ditrimethylolpropane tetra(meth)acrylate, pentaerythritol tetra(meth)acrylate, dipentaerythritol monohydroxypenta(meth)acrylate, alkyl-modified dipentaerythritol penta(meth)acrylate, dipentaerythritol hexa(meth)acrylate and the like.

These (meth)acrylate monomers can be used singly or in mixture of two or more kinds thereof.

As the component (D), a (meth)acrylate having an ether bond and a (meth)acryloyl group is preferable and a polyether monomer having 8 to 30 ether bond repeating structures in one molecule is most preferable. The polyether monomer separates from the moisture permeating from the outside into the cured product in a high temperature and high humidity atmosphere and does not become cloudy or becomes hardly cloudy when the ether bond repeating structures are 8 or more, and the monomers do not crystallize and the cured product does not become cloudy or becomes hardly cloudy in the case of a polyether monomer having 30 or less ether bond repeating structures. These may be used singly, or a plurality of these may be used in combination.

Examples of the (meth)acrylate having an ether bond and a (meth)acryloyl group include polyethylene glycol mono (meth)acrylate, polyethylene glycol di(meth)acrylate, polypropylene glycol mono(meth)acrylate, polypropylene glycol di(meth)acrylate, polyoxytetramethylene glycol mono (meth)acrylate, polyoxytetramethylene glycol di(meth)acrylate and the like. Among these, a bifunctional (meth)acrylate having an ether bond and a (meth)acryloyl group is preferable, polyethylene glycol di(meth)acrylate, polypropylene glycol di(meth)acrylate, and polyoxytetramethylene glycol di(meth)acrylate are preferable, and polyethylene glycol di(meth)acrylate is more preferable. The molecular weight of the (meth)acrylate having an ether bond and a (meth)acryloyl group is preferably in a range of 200 to 5000, more preferably 250 to 3000. Specific examples thereof include M-90G, AM-130G, M-230G, A-400, A-600, APG-700, A-1000, 9G, 14G, 23G, 1206PE and the like manufactured by SHIN NAKAMURA CHEMICAL INDUSTRY CO., LTD., PDE-600, PDP-700, ADE-600 and the like manufactured by NOF CORPORATION, 130MA, 130A, 14EG, 14EG-A and the like as the LIGHT ESTER series manufactured by KYOEISHA CHEMICAL CO., LTD., but are not limited thereto.

In order to lower the viscosity of the composition and to improve the handleability, the amount of the component (D) added is preferably 0.1 to 50 parts by mass, more preferably 0.1 to 30 parts by mass, still more preferably 0.1 to 10 parts by mass with respect to 100 parts by mass of the component (A).

The photocurable composition of the present invention preferably further contains a component (E): coupling agent. As the component (E) is further contained, the adhesive strength is improved.

The component (E) that can be used in the present invention is, for example, a silane coupling agent. Specific examples of the component (E) include glycidyl group-containing silane coupling agents such as 2-(3,4-epoxycyclohexyl)ethyltrimethoxysilane, 3-glycidoxypropyltriethoxysilane, 3-glycidoxypropylmethyldimethoxysilane, 3-glycidoxypropyltrimethoxysilane, and 3-glycidoxypropylmethyldiethoxysilane, vinyl group-containing silane coupling agents such as vinyltris(β-methoxyethoxy)silane, vinyltriethoxysilane, and vinyltrimethoxysilane, (meta)acryloyl group-containing silane coupling agents such as γ-methacryloxypropyltrimethoxysilane (3-methacryloxypropyltrimethoxysilane), amino group-containing silane coupling agents such as N-β-(aminoethyl)-γ-aminopropyltrimethoxysilane, γ-aminopropyltriethoxysilane, and N-phenyl-γ-aminopropyltrimethoxysilane, and γ-mercaptopropyltrimethoxysilane, γ-chloropropyltrimethoxysilane and the like. These may be used singly or two or more kinds thereof may be used concurrently. Among these, a silane coupling agent having an epoxy group or a (meth)acryloyl group is preferably used and a (meth)acryloyl group-containing silane coupling agent is more preferably used from the viewpoint that further improvement in adhesive property can be expected.

From the viewpoint of adhesive property, the amount of the component (E) added is preferably 0.1 to 10 parts by mass, more preferably 0.1 to 5 parts by mass with respect to 100 parts by mass of the component (A).

In addition, as other components, additives such as fillers such as an inorganic filler and an organic filler, a storage stabilizer, an antioxidant, a light stabilizer, an ultraviolet absorber, an adhesive auxiliary, a plasticizer, a dye, a pigment, a flame retardant, a sensitizer, a thermal initiator, a heavy metal deactivator, an ion trap agent, an emulsifier, an aqueous dispersion stabilizer, a defoaming agent, a mold release agent, a leveling agent, wax, a rheology control agent, and a surfactant may be blended as long as the object of the present invention is not impaired.

Specific examples of the inorganic filler include glass powder, fumed silica powder, silica powder, alumina powder, mica powder, silicone rubber powder, calcium carbonate powder, aluminum nitride powder, carbon powder, kaolin clay powder, dried clay mineral powder, dried diatomaceous earth powder, metal powder and the like. Further, examples of the fumed silica powder include those of which the surface is chemically modified (hydrophobicized) with organochlorosilanes, polyorganosiloxane, hexamethyldisilazane and the like, and examples thereof include commercially available products such as R974, R972, R972V, R972CF, R805, R812, R812S, R816, R8200, RY200, RX200, RY200S, R202 and the like as the AEROSIL series manufactured by NIPPON AEROSIL CO., LTD. For the purpose of, for example, improving fluidity and the purpose of improving the mechanical strength of the cured product, the amount of the inorganic filler blended is preferably about 0.1 to 100 parts by mass with respect to 100 parts by mass of the sum of the components (A) to (C).

Examples of the ultraviolet absorber include 2-(5-chloro-2-benzotriazolyl)-6-tert-butyl-p-cresol, 2-(2'-hydroxy-5'-tert-octylphenyl)benzotriazole, 2-(2'-hydroxy-3'-tert-butyl-5'-methylphenyl)-5-chlorobenzotriazole, 2-(3,5-di-tert-amyl-2-hydroxyphenyl)benzotriazole, tetrakis(1,2,2,6,6-pentamethylpiperidin-4-yl) 1,2,3,4-butanetetracarboxylate, bis(2,2,6,6-tetramethyl-4-piperidyl) sebacate, bis(1,2,2,6,6-pentamethyl-4-piperidyl) sebacate and the like, but are not limited thereto. Specific examples of the ultraviolet absorber include ADK STAB LA-52, LA-57, LA-63P, LA-68, LA-72, LA-77Y, LA-77G and the like manufactured by ADEKA CORPORATION and JF-90, JF-95 and the like manufactured by JOHOKU CHEMICAL CO., LTD., but are not limited thereto.

The photocurable composition of the present invention can be obtained by volatilizing the solvent in a stock solution which contains the components (A) to (C) (and optionally the components (D) and (E) and other components) and a solvent and in which the photocurable composition contains 1 to 45 parts by mass of the component (B) with respect to 100 parts by mass of the component (A). By adding the solvent in this way, the viscosity can be lowered.

Examples of the solvent include alcohols such as methanol and ethanol, chlorine-based solvents such as dichloroethane and trichloroethane, fluorine-based solvents such as trichlorofluoroethane, ketone-based solvents such as acetone, methyl ethyl ketone, and methyl isobutyl ketone, ester-based solvents such as methyl acetate, ethyl acetate, propyl acetate, and butyl acetate, ethers such as dimethyl ether and methyl ethyl ether, hydrocarbon-based solvents such as pentane, hexane, heptane, and cyclohexane, aromatic solvents such as benzene, toluene, and xylene, and the like. A ketone-based solvent is preferable in consideration of compatibility with the components (A) to (C) (furthermore, the component (D)) of the present invention. The amount of the solvent added is preferably 50 to 200 parts by mass with respect to 100 parts by mass of the sum of the components (A) to (C), and the film thickness can be decreased to 200 μm or less when the photocurable composition is molded into a sheet shape if the amount of the solvent added is in this range.

As a method for processing the stock solution into a film shape (sheet shape), a known technology can be used. For example, a solvent is added to the respective components constituting the photocurable composition to prepare a stock solution of which the viscosity is intentionally lowered, the stock solution is applied to the release film of which the surface has been subjected to a release treatment in advance, and then the solvent is dried (volatilized) to process the stock solution into a film shape. In other words, the present invention also provides a method for producing a photocurable composition having a film shape at 25° C. in a state of not being cured, in which the photocurable composition is a film formed by volatilizing the solvent in a stock solution. By this, a photocurable composition having a film shape at 25° C. in a state of not being cured is formed. In addition, a release film may be bonded to one side or both sides of the photocurable composition having a film shape. Specific examples of the coating method include a flow coating method, a roll coating method, a gravure roll method, a wire bar method, a lip die coating method and the like. In addition, as a drying device in the drying step, a hot air drying furnace, an IR furnace, and the like can be used. Examples of the material for the release film include plastic films such as polyethylene, polypropylene, polyethylene terephthalate, and polyester films, paper, clothes, non-woven fabrics, and the like, but a plastic film is preferable from the viewpoint of releasability. The thickness of the release film is preferably 5 to 300 μm, more preferably 25 to 200 μm. The release film is preferably one subjected to a release treatment with a fluorine-based compound, a silicone-based compound, a long-chain alkyl-based compound, and the like.

The thickness of the photocurable composition having a film shape at 25° C. is, for example, 200 μm or less, further 10 to 200 μm, and 30 to 150 μm.

In the present invention, a solvent can also be used in order to process the photocurable composition into a sheet shape. Examples of the solvent include alcohols such as methanol and ethanol, chlorine-based solvents such as dichloroethane and trichloroethane, fluorine-based solvents such as trichlorofluoroethane, ketone-based solvents such as acetone, methyl ethyl ketone, and methyl isobutyl ketone, ester-based solvents such as methyl acetate, ethyl acetate, propyl acetate, and butyl acetate, ethers such as dimethyl ether and methyl ethyl ether, hydrocarbon-based solvents such as pentane, hexane, heptane, and cyclohexane, aromatic solvents such as benzene, toluene, and xylene, and the like. A ketone-based solvent is preferable in consideration of compatibility with the components (A) to (D) of the present invention. The amount of the solvent added is preferably 50 to 200 parts by mass with respect to 100 parts by mass of the sum of the components (A) to (D), and the film thickness can be decreased to 200 μm or less when the photocurable composition is molded into a sheet shape if the amount of the solvent added is in this range.

In the photocurable composition of the present invention, the temperature of tan δ=1 is 30° C. to 60° C., more preferably 30° C. to 50° C. before curing. The temperature of tan δ=1 can be measured using a rheometer. tan δ is calculated from the storage elastic modulus (G') and the loss elastic modulus (G'') and is in the relation of G''/G'=tan δ, and the meaning of the temperature of tan δ=1 represents the temperature at the boundary between a solid and a liquid.

In the present invention, a film shape refers to a flat plate-shaped state having a constant thickness. As described above, when the temperature of tan δ=1 is 30° C. or more, the photocurable composition can be formed into a film shape. In addition, when the temperature of tan δ=1 is 60° C. or less, it is possible to achieve bonding by lamination at normal temperature.

The temperature of tan δ=1 can be appropriately adjusted, for example, by selecting the molecular weights and structures of the component (A), the component (B), and the component (D) to be blended depending on the circumstances.

The photocurable composition of the present invention preferably has a storage elastic modulus of $10.0 \times 10^5$ Pa or less, more preferably $1.0 \times 10^5$ to $10.0 \times 10^5$ Pa at 25° C. after being cured. In other words, the storage elastic modulus at 25° C. of the cured product obtained by curing the photocurable composition having a film shape at 25° C. is preferably $10.0 \times 10^5$ Pa or less, more preferably $1.0 \times 10^5$ to $10.0 \times 10^5$ Pa. The storage elastic modulus at 25° C. can be measured at each frequency by DMA (dynamic viscoelasticity measurement). As the storage elastic modulus of the photocurable composition at 25° C. after being cured is $10.0 \times 10^5$ Pa or less, the peel strength is improved. The storage elastic modulus of the photocurable composition at 25° C. after being cured can be appropriately adjusted by, for example, selecting the component (A).

The photocurable composition of the present invention can be cured by being irradiated with energy rays such as ultraviolet light and visible light. Irradiation light in a wavelength region of 150 to 750 nm is preferable, and the photocurable composition can be cured with an integrated light quantity of 1 to 100 kJ/m$^2$, preferably an integrated light amount of 5 to 70 kJ/m$^2$ using a low pressure mercury lamp, a medium pressure mercury lamp, a high pressure mercury lamp, an ultra high pressure mercury lamp, a xenon lamp, a metal halide lamp, or an LED lamp.

The photocurable composition of the present invention can be used in assembly of display devices such as liquid crystal displays and organic EL displays. Specifically, the photocurable composition is suitable for assembly of a display element, a cover panel, a touch panel and the like into a display device and assembly of an organic EL element itself. As a member when these are assembled, various members are used in complex. Examples thereof include untreated PET that has not been subjected to a surface treatment such as corona treatment, treated PET, a glass plate, an acrylic plate, a polycarbonate plate and the like, and further these are pasted in various combinations.

The step of pasting two (transparent) adherends using a photocurable composition having a film shape in which a release film is bonded to one side will be described below. The pasting step includes a lamination step and a curing step.

In the lamination step, the photocurable composition having a film shape at 25° C. is transferred to one adherend in an atmosphere of 20° C. to 30° C. For example, bonding is performed in a state where the side on which the release film is not bonded of the photocurable composition having a film shape is attached to one adherend using a laminator while applying pressure and heat depending on the circumstances. After that, the release film is peeled off, and another adherend is similarly bonded using a laminator. Vacuum heating may be performed on the laminate transferred to two adherends, which is thus obtained. By performing vacuum heating, bubbles do not remain or hardly remain inside during bonding. The temperature in vacuum heating is preferably 30° C. to 60° C. since the above effects can be more easily obtained. Examples of the method for performing vacuum heating include autoclaving.

Finally, the photocurable composition having a film shape is cured by being irradiated with energy rays, whereby two adherends can be pasted to each other. Instead of a laminator, a vacuum pressing machine, a vacuum laminator, an autoclave, or the like by which bonding can be performed in a vacuum or in a reduced pressure atmosphere can be mentioned. The pasting step is not limited to this.

EXAMPLES

Next, the present invention will be described in more detail with reference to Examples, but the present invention is not limited only to these Examples. Hereinafter, the photocurable composition having a film shape at 25° C. in a state of not being cured obtained by drying of the solvent is simply referred to as a film-like composition, and the stock solution containing the respective components constituting the photocurable composition and a solvent is simply referred to as a stock solution.

Examples 1 to 4 and Comparative Examples 1 to 3

The following components were prepared in order to prepare a stock solution.

Component (A): urethane-modified (meth)acrylate oligomer

Urethane acrylate having weight average molecular weight: 30000, (meth)acrylic group equivalent: 19000 g/eq, polycarbonate as main skeleton (hereinafter referred to as oligomer 1)

Urethane acrylate having weight average molecular weight: 30000, (meth)acrylic group equivalent: 14000 g/eq, polycarbonate as main skeleton (hereinafter referred to as oligomer 2)

Urethane acrylate having weight average molecular weight: 30000, (meth)acrylic group equivalent: 9600 g/eq, polycarbonate as main skeleton (hereinafter referred to as oligomer 3)

Urethane acrylate having weight average molecular weight: 50000, (meth)acrylic group equivalent: 9600 g/eq, polycarbonate as main skeleton (hereinafter referred to as oligomer 4)

Component (B): film forming agent

Mixed type of bisphenol A type epoxy resin/bisphenol F type (solid content: 100%) having weight average molecular weight: 60000 (jER4250 manufactured by Mitsubishi Chemical Corporation)

Component (C): photoinitiator 2,4,6-Trimethylbenzoyl-diphenyl-phosphine oxide (IRGACURE TPO manufactured by BASF) Component (D): (meth)acrylate monomer (excluding component (A))

Polyethylene glycol #1000 dimethacrylate (repeating of ethylene glycol: n=23) (NK Ester 23G manufactured by SHIN NAKAMURA CHEMICAL INDUSTRY CO., LTD.)

Polyethylene glycol #600 dimethacrylate (repeating of ethylene glycol: n=14) (NK Ester 14G manufactured by SHIN NAKAMURA CHEMICAL INDUSTRY CO., LTD.)

Component (E): coupling agent
3-Methacryloxypropyltrimethoxysilane (KBM-503 manufactured by Shin-Etsu Chemical Co., Ltd.)

Solvent
Methyl ethyl ketone (reagent)

The components (A) to (E) and the solvent are weighed and placed in a stirring pot and stirred in an atmosphere of 25° C. for 1 hour. If weight of methyl ethyl ketone has decreased from the total weight before stirring by volatilization, the volatilized weight of methyl ethyl ketone is supplemented. The detailed preparation amounts are presented in Table 1, and the numerical values are all noted in parts by mass.

The stock solutions of Examples 1 to 4 and Comparative Examples 1 to 3 were each applied onto a release film with a clearance of 100 μm using a belt conveyor type coating machine, and dried by allowing the coated release film to pass through a drying line having a length of 1.5 m in an atmosphere of 80° C. and two drying lines having a length of 1.5 m in an atmosphere of 100° C. at a speed of 500 mm/min to form the composition into a film shape. After that, another release film is bonded thereto to prepare a film-like composition to which two release films are attached. The film thickness including the release films was measured using a thickness gauge, the thicknesses of the two release films were subtracted from the measured film thickness, and the thickness of the film-like composition was thus 50 μm. In the drying for volatilizing the solvent, the solvent dries from the surface and the solvent inside the coating film thus hardly volatilizes. Hence, air bubbles remain inside the coating film when the film thickness is thick, and the clearance is thus preferably 300 μm or less.

are presented in Table 1. In Table 1, the unit of flow beginning temperature is ° C.

The test pieces for the following total light transmittance measurement and cloudiness (haze) measurement are fabricated as follows. A film-like composition from which one release film has been peeled off is attached to an alkali-free glass plate having a thickness of 0.7 mm, a width of 100 mm, and a length of 100 mm, and transferred using a thermal roll laminator having a roll temperature set to 25° C. After that, another release film is peeled off, and the alkali-free glass plate is attached to the film-like composition, degassing is performed for 120 seconds in an atmosphere of 50° C. using a vacuum laminator for bonding. Irradiation with ultraviolet light is performed in an integrated light quantity of 30 kJ/m² using a belt conveyor type ultraviolet irradiator equipped with a high pressure mercury lamp, thereby fabricating a test piece in which a film-like composition is bonded to alkali-free glass.

[Total Light Transmittance Measurement (after Curing)]

A test piece including a film-like composition having a thickness of 50 μm is used and a spectroscopic haze meter SH7000 manufactured by NIPPON DENSHOKU INDUSTRIES CO., LTD. is used to measure the total light transmittance. The light transmittance at a wavelength in a range of 780 nm to 380 nm is measured, the number of tests is set to n=3, the average value thereof is calculated, and the result is taken as the "total light transmittance (%)" according to

TABLE 1

| Component | Name of raw material | Example 1 | Example 2 | Example 3 | Example 4 | Comparative Example 1 | Comparative Example 2 | Comparative Example 3 |
|---|---|---|---|---|---|---|---|---|
| Component (A) | Oligomer 1 | 100 | | | | 100 | 100 | |
| | Oligomer 2 | | 100 | | | | | |
| | Oligomer 3 | | | 100 | | | | |
| | Oligomer 4 | | | | 100 | | | 100 |
| Component (B) | jER4250 | 33 | 33 | 33 | 22 | 10 | 50 | 33 |
| Component (C) | TPO | 2.0 | 2.0 | 2.0 | 2.0 | 2.0 | 2.0 | 2.0 |
| Component (D) | 23G | | | | 1.2 | | | 1.3 |
| | 14G | 4.0 | 4.0 | 4.0 | 2.4 | 3.3 | 4.5 | 2.7 |
| Component (E) | KBM-503 | 1.3 | 1.3 | 1.3 | 1.2 | 1.1 | 1.5 | 1.3 |
| Solvent | Methyl ethyl ketone | 138.6 | 138.6 | 138.6 | 127.6 | 115.3 | 155.3 | 138.6 |
| | Sum | 279.2 | 279.2 | 279.2 | 256.7 | 231.7 | 313.3 | 279.2 |

Using the film-like compositions formed of the stock solutions of Examples 1 to 4 and Comparative Examples 1 to 3, the rheometer measurement (before curing), total light transmittance measurement (after curing), cloudiness (haze) measurement (after curing), peel strength measurement (after curing), and dynamic viscoelasticity measurement were performed. Hereinafter, the numbers of stock solutions in Table 1 are reflected as they are to be noted in Table 2.

[Rheometer Measurement (Before Curing)]

The film-like composition is peeled off from the release film and stacked one on another so as to have a thickness of 700 μm, and degassing is performed using a vacuum laminator. Viscoelasticity measurement was performed in a temperature range of 0° C. to 100° C. using HAAKE MARS III manufactured by Thermo Fisher Scientific Inc. The temperature of tan δ=1 is taken as the "flow beginning temperature (° C.)". In the present invention, lamination at normal temperature is possible when the flow beginning temperature is 30° C. to 60° C. Still more preferably, the flow beginning temperature is 30° C. to 50° C. The results the following evaluation criteria. The details conform to JIS K 7361-1: 1997. For use in optical applications, the total light transmittance is preferably 90% or more. The results are presented in Table 1. In Table 1, the unit of total light transmittance is %.

[Cloudiness (Haze) Measurement (after Curing)]

The above test piece is used, and a spectroscopic haze meter SH7000 manufactured by NIPPON DENSHOKU INDUSTRIES CO., LTD. is used. The light transmittance at a wavelength in a range of 780 nm to 380 nm is measured, and the cloudiness is calculated. The details conform to JIS K 7136: 2000. The number of tests is set to n=3, the average value thereof is calculated, the result is taken as the "cloudiness (no unit)", and the results are presented in Table 1. In order to achieve colorless transparency, the cloudiness is preferably 1.0 or less.

[Measurement of Peel Strength (after Curing)]

The 180-degree peel strength is measured in the following three combinations using an untreated PET film having a length of 100 mm, a width of 25 mm, and a thickness of 38

μm (manufactured by TOYOBO FILM SOLUTIONS LIMITED), an alkali-free glass plate having a length of 100 mm, a width of 25 mm, and a thickness of 2 mm, an acrylic plate having a length of 100 mm, a width of 25 mm, and a thickness of 2 mm (manufactured by ASAHI-BETECHNO), and a polycarbonate plate having a length of 100 mm, a width of 25 mm, and a thickness of 2 mm (manufactured by ASAHI-BETECHNO).

Test piece 1: glass plate/untreated PET film
Test piece 2: acrylic plate/untreated PET film
Test piece 3: polycarbonate plate/untreated PET film As the processing conditions of the test piece, each plate passes through a thermal roll laminator at a roll temperature of 25° C. and a pressure of 0.2 MPa in a state where the film-like composition is stacked in a region of 70 mm in length and 25 mm in width of each plate, the release film is peeled off, untreated PET is stacked thereon, and the stacked body passes through the laminator again under the same conditions. Thereafter, the test piece is left in the autoclave for 20 minutes at a pressure of 0.5 MPa in an atmosphere of 50° C. After it has been confirmed that the test piece has cooled to room temperature, the test piece is irradiated with ultraviolet light in an integrated light quantity of 30 kJ/m$^2$ using a belt conveyor type ultraviolet irradiator. The strength at a speed of 60 mm/min is measured using a precision universal testing machine (Autograph AGX-V series) manufactured by Shimadzu Corporation, and the average value thereof is taken as the "peel strength (kN/m)". The results are presented in Table 1. In Table 1, the unit of peel strength is kN/m. The peel strength is preferably 1.0 kN/m or more in all the three combinations (test pieces 1 to 3) of adherends.

[Dynamic Viscoelasticity Measurement (DMA)]

A test piece is fabricated by irradiating a film-like composition having a length of 60 mm, a width of 10 mm, and a thickness of 0.7 mm with ultraviolet light in an integrated light quantity of 30 kJ/m$^2$ using a belt conveyor type ultraviolet irradiator. The measurement is performed in a temperature range of −50° C. to 100° C. at a frequency of 1 Hz using (DMS6100) manufactured by Hitachi High-Tech Science Corporation. The "storage elastic modulus (×105 Pa)" at a frequency of 1 Hz and 25° C. is confirmed. The results are presented in Table 1. In Table 1, the unit of storage elastic modulus is Pa. The storage elastic modulus is preferably $1.0 \times 10^5$ to $10.0 \times 10^5$ Pa.

1 to 45 parts by mass of the component (B) is contained with respect to 100 parts by mass of the component (A) in Examples 1 to 4 and the parameters that the temperature of tan δ=1 is 30° C. to 60° C. before curing and the storage elastic modulus at 25° C. is $10.0 \times 10^5$ Pa or less after curing are satisfied as the amount of the component (B) is in this range. In addition, the film-like composition can be used in optical applications since the total light transmittance is high and the cloudiness is low.

INDUSTRIAL APPLICABILITY

Generally, it is difficult to maintain a high 180-degree peel strength against untreated PET as an adherend, but the photocurable composition can be transferred to untreated PET at normal temperature and exhibits high adhesive property and can be thus used in assembly of display devices such as liquid crystal displays and organic EL displays. Specifically, the photocurable composition is suitable for assembly of a display element, a cover panel, a touch panel, VR goggles, and the like into a display device and assembly of an organic EL element itself, and can be applied to adherends having a curved surface instead of a flat surface since heating is not required for transfer of the photocurable composition.

This application is based upon and claims the benefit of priority of the prior Japanese Patent Application No. 2020-084884 filed on May 14, 2020, the entire contents of which are incorporated herein by reference.

What is claimed is:

1. A photocurable composition having a film shape at 25° C. in a state of not being cured, the photocurable composition comprising the following components (A) to (E), wherein the photocurable composition contains 20 to 40 parts by mass of the component (B) with respect to 100 parts by mass of the component (A) and 0.1 to 10 parts by mass of the component (D) with respect to 100 parts by mass of the component (A), a temperature of tan δ=1 is 30° C. to 50° C. before curing, and a storage elastic modulus at 25° C. is $1.0 \times 10^5$ to $10.0 \times 10^5$ Pa or less when the photocurable composition is cured:

TABLE 2

| Test item | | Example 1 | Example 2 | Example 3 | Example 4 | Comparative Example 1 | Comparative Example 2 | Comparative Example 3 |
|---|---|---|---|---|---|---|---|---|
| Flow beginning temperature | | 38 | 48 | 40 | 44 | 25 | 44 | 53 |
| Total light transmittance | | 92 | 92 | 92 | 92 | 92 | 92 | 92 |
| Cloudiness | | 0.05 | 0.05 | 0.05 | 0.05 | 0.05 | 0.05 | 0.05 |
| Peel strength | Test piece 1 | 21 | 1.0 | 2.3 | 1.1 | 0.7 | 0.9 | 0.3 |
| | Test piece 2 | 20 | 1.4 | 1.1 | 1.2 | 0 7 | 0.2 | 0.3 |
| | Test piece 3 | 1.9 | 1.3 | 1.2 | 1.6 | 0.7 | 1.2 | 0.5 |
| Storage elastic modulus | | 6.1 | 2.4 | 5.4 | 7.4 | 2.2 | 6.4 | 72.0 |

With regard to the peel strength, Examples 1 to 4 have higher strengths in each of the test pieces 1 to 3 as compared with Comparative Examples 1 to 3. This indicates that transfer at 20° C. to 30° C. (normal temperature) is possible, and the adherend is only pressed and heating is not required for transfer. Finally, it can be seen that stable adhesive strength is exerted even to untreated PET that is a hardly pasted material. It is presumed that this is due to the fact that component (A): urethane-modified (meth)acrylate oligomer;
component (B): phenoxy resin of which a weight average molecular weight is 30,000 to 80,000; component (C): photoinitiator;
component (D): (meth)acrylate monomer that is different from the component (A); and
component (E): 3-Methacryloxypropyltrimethoxysilane, wherein a weight average molecular of the component (A) is 20,000 to 40,000, and a (meth)acrylic group equivalent of the component (A) is 5000 to 25000 g/eq.

2. The photocurable composition having a film shape at 25° C. in a state of not being cured according to claim 1, wherein the phenoxy resin is solid at 25° C. and does not have a (meth)acrylic group in a molecule.

3. The photocurable composition having a film shape at 25° C. in a state of not being cured according to claim 1, wherein the (meth)acrylic group equivalent of the component (A) is 15000 to 25000 g/eq.

4. The photocurable composition having a film shape at 25° C. in a state of not being cured according to claim 1, wherein the photocurable composition can be transferred to an adherend at 20° C. to 30° C.

5. A cured product obtained by curing the photocurable composition according to claim 1.

6. A bonding method of two adherends, the method comprising transferring the photocurable composition having a film shape at 25° C. in a state of not being cured according to claim 1 to one adherend in an atmosphere of 20° C. to 30° C. and then transferring the photocurable composition to another adherend as well.

7. The bonding method according to claim 6, wherein vacuum heating is performed on a laminate transferred to two adherends.

8. The bonding method according to claim 7, wherein a temperature in vacuum heating is 30° C. to 60° C.

9. A stock solution comprising the following components (A) to (E) and a solvent, wherein the stock solution contains 20 to 40 by mass of the component (B) with respect to 100 parts by mass of the component (A) and 0.1 to 10 parts by mass of the component (D) with respect to 100 parts by mass of the component (A):
component (A): urethane-modified (meth)acrylate oligomer;
component (B): phenoxy resin of which a weight average molecular weight is 30,000 to 80,000; and
component (C): photoinitiator;
component (D): (meth)acrylate monomer that is different from the component (A); and
component (E): 3-Methacryloxypropyltrimethoxysilane,
wherein a weight average molecular of the component (A) is 20,000 to 40,000 and a (meth)acrylic group equivalent of the component (A) is 5000 to 25000 g/eq.

10. A method for producing a photocurable composition having a film shape at 25° C. in a state of not being cured, the method comprising obtaining a photocurable composition having a film shape at 25° C. by volatilizing the solvent in the stock solution according to claim 9.

* * * * *